United States Patent [19]
Carbon

[11] 3,999,473
[45] Dec. 28, 1976

[54] BAKER FOR WAFFLES, PANCAKES AND SIMILAR FOOD ITEMS

[76] Inventor: Fred S. Carbon, 105 Days Ave., Buchanan, Mich. 49107

[22] Filed: Mar. 24, 1975

[21] Appl. No.: 561,431

Related U.S. Application Data

[63] Continuation-in-part of Ser. No. 491,363, July 24, 1974, abandoned.

[52] U.S. Cl. .............................. 99/377; 219/524
[51] Int. Cl.² .......................................... A47J 37/00
[58] Field of Search ............ 219/524, 525; 99/372, 99/377, 380, 443; D7/87, 88, 89

[56] References Cited

UNITED STATES PATENTS

| | | | |
|---|---|---|---|
| 1,708,499 | 4/1929 | Filbey | 99/377 |
| 1,954,235 | 4/1934 | Becker et al. | 99/377 |
| 2,116,688 | 5/1938 | Ratliff | 99/377 X |
| D87,896 | 10/1932 | Wagner | D7/88 |

Primary Examiner—Billy J. Wilhite
Attorney, Agent, or Firm—Oltsch & Knoblock

[57] ABSTRACT

A baker for waffles, pancakes and similar food items which includes a pair of confronting shell members pivotally supported upon a base member. Each of the shell members has a heating element therein. The shell members are hinged to permit their opening and closing for the purpose of receiving a batter and discharging a baked food item.

3 Claims, 10 Drawing Figures

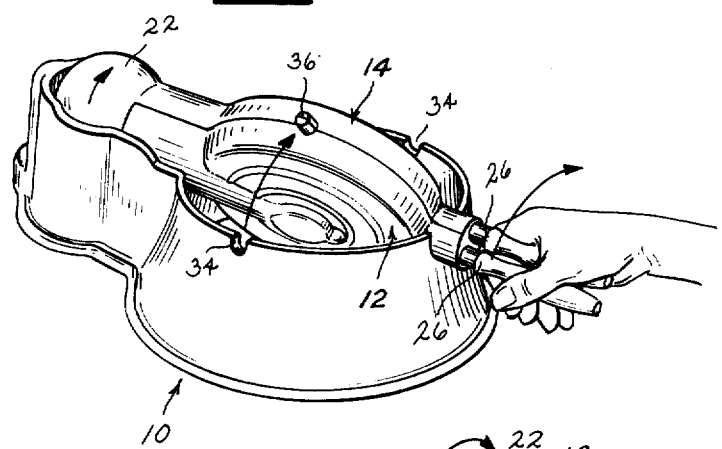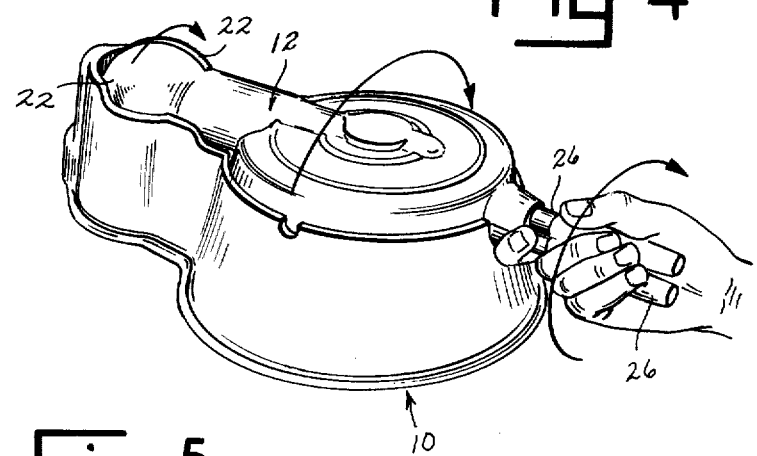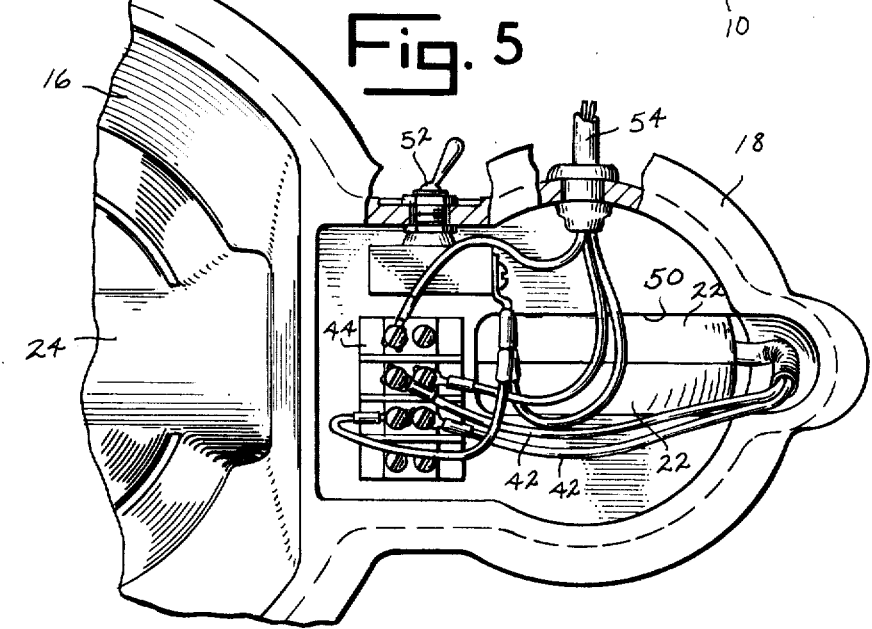

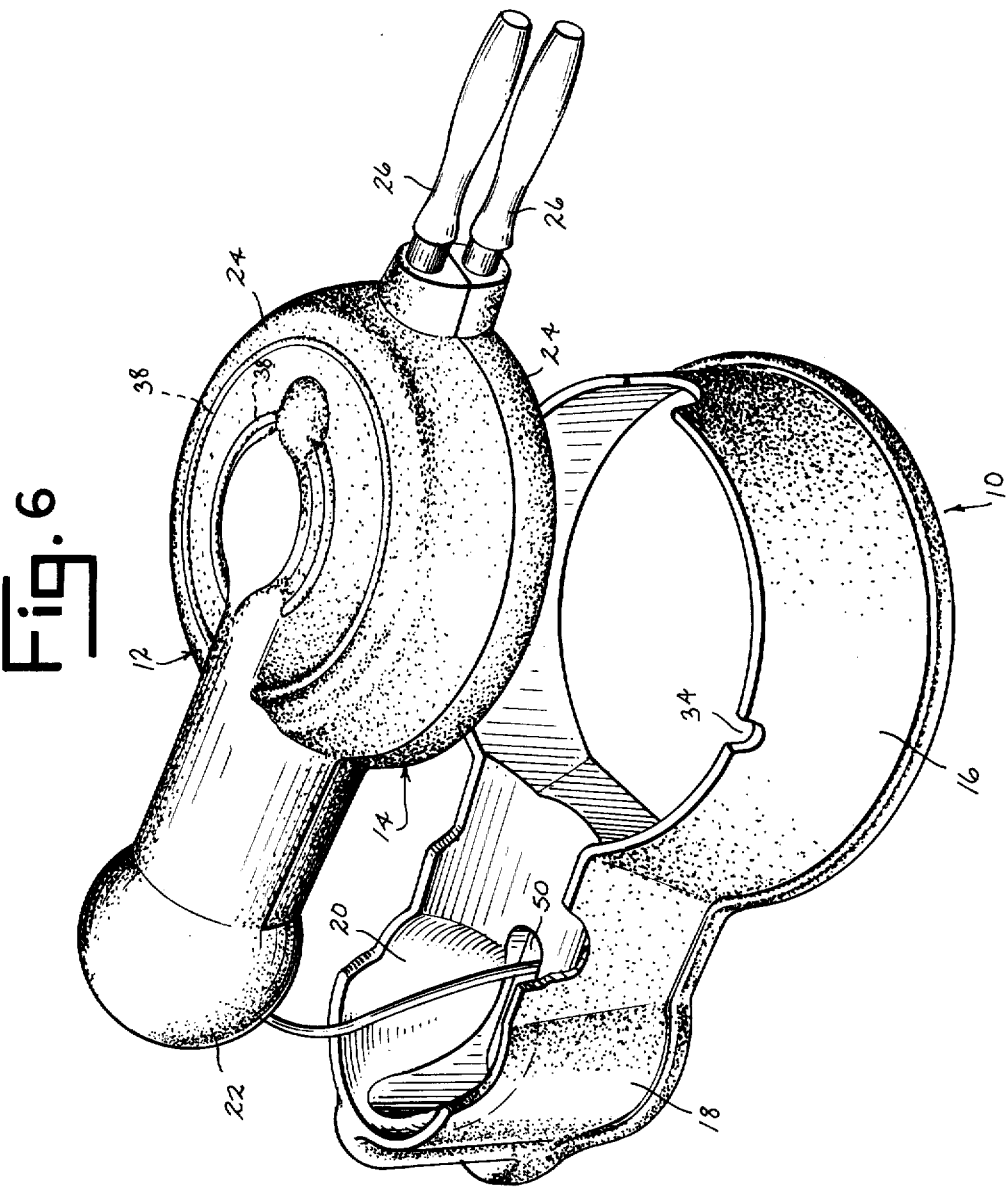

BAKER FOR WAFFLES, PANCAKES AND SIMILAR FOOD ITEMS

CROSS REFERENCE TO RELATED APPLICATION

This application is a continuation-in-part of U.S. application Ser. No. 491,363, filed July 24, 1974 now abandoned.

SUMMARY OF THE INVENTION

This invention relates to an improved device utilized to bake waffles, pancakes and similar types of food items and in which heating elements are utilized in each of two shell members which constitute the batter receiving elements of the baking device.

The shell members are hinged and are shiftable between an open position, which allows the batter to be placed within the shell members and the baked waffle, pancake or similar food item to be removed therefrom, and a closed position in which the baking of the food item can take place. A base member supports the shell members. The shell members are pivotal while being supported by the base member in their closed position to allow the batter to fully fill the shell members during the baking process.

Accordingly, it is an object of this invention to provide a baker which is for waffles, pancakes and similar food items and which includes individually heated cooperating shell or griddle members to enable the food items to be more evenly baked.

Another object of this invention is to provide a baker which is for waffles, pancakes and similar food items and which is of simple operation.

Still another object of this invention is to provide a baker which is for waffles, pancakes and similar food items and which is of a construction enabling the batter within the shell members to completely cover the void formed therein and to be evenly baked.

Other objects of this invention will become apparent upon a reading of the invention's description.

BRIEF DESCRIPTION OF THE DRAWINGS

FIG. 3 is a perspective view illustrating the manner in which the shell members are turned during the baking process.

FIG. 4 is a perspective view showing the shell members having been turned 180°.

FIG. 5 is a fragmentary perspective view taken along line 5—5 of FIG. 1.

FIG. 6 is a perspective view showing the shell members and the base member of the baker in separated form.

DESCRIPTION OF THE PREFERRED EMBODIMENTS

The preferred embodiments illustrated are not intended to be exhaustive or to limit the invention to the precise forms disclosed. They are chosen and described in order to best explain the invention and its application and practical use to thereby enable others skilled in the art to best utilize the invention.

Figure 1:
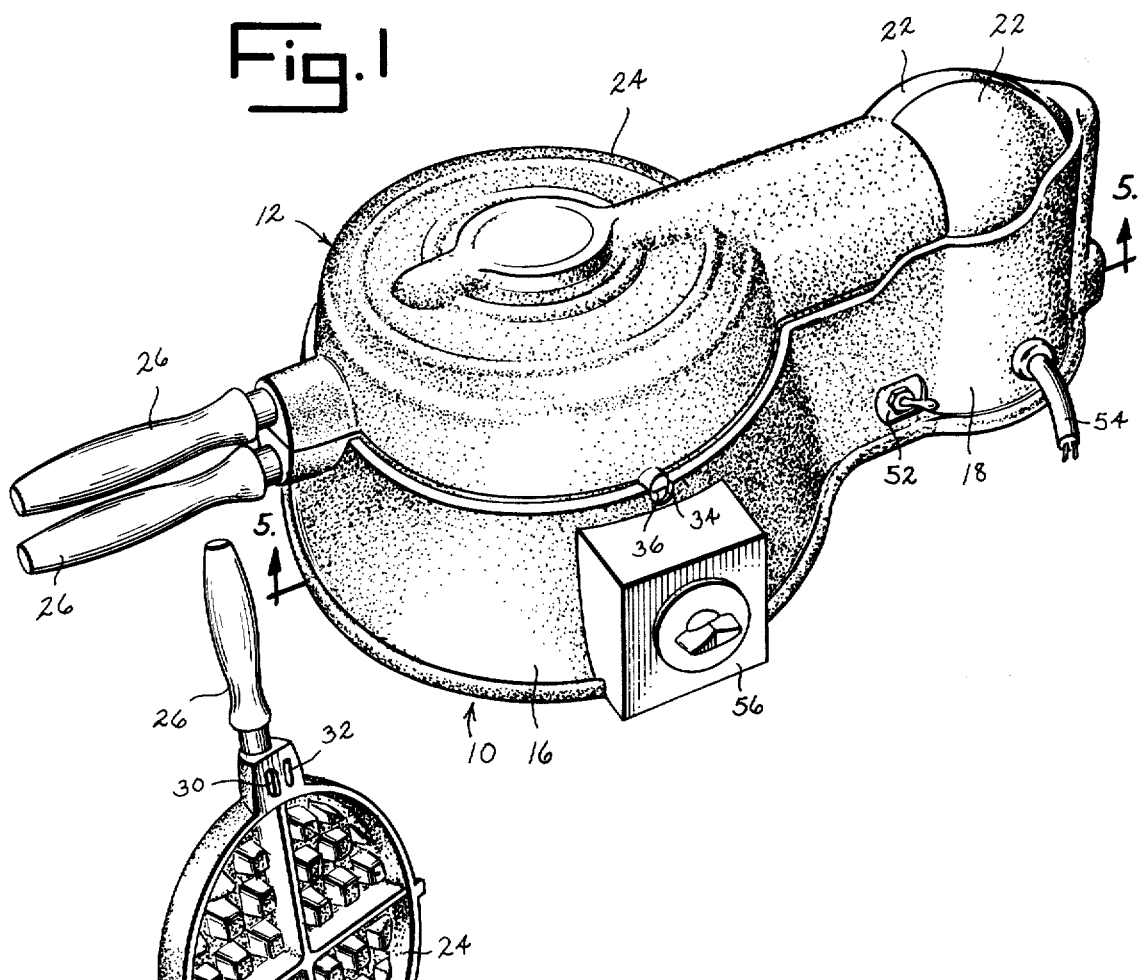
FIG. 1 is a perspective view of the baker showing the shell members thereof in their closed position.

The baker so illustrated in the figures includes a base member 10 and a pair of shell members 12 and 14. Base member 10, as best illustrated in FIG. 6, includes an upwardly tapered circular wall 16 to which is attached a tongue 18. Tongue 18 is channel shaped and has a socket 20 formed therein spaced from wall 16. Shell members 12 and 14 are similarly constructed with each including a hinge part 22, a recessed or concave food or batter receiving part 24, and a handle 26. Hinge part 22 of each shell member is of a hollow semi-spherical construction having an open edge face 28 formed along a vertical plane. Hinge parts 22 are fitted complementally together with their edge faces 28 confronting one another and with their outer semi-spherical surfaces forming a completed sphere as shown in FIG. 6. The cooperating hinge parts 22 are received pivotally within socket 20 of base member 10. This permits shell members 12 and 14 to be pivoted between the closed position shown in FIG. 1 in which the batter receiving parts 24 confront one another to form an enclosed baking compartment therein and the open position shown in FIG. 2. The interior of batter receiving parts 24 of the shell members may be formed into compartments, as when the baker is used to produce waffles, having the usual indentations and quartered sections. It is preferable for each shell member 12 and 14 to have a guide tab 30 formed near its handle 26 which is receivable within a recess 32 in the other shell member. Tabs 30 and recesses 32 cooperate to align the two shell members when the shell members are in their closed position.

As illustrated in FIGS. 3 and 4, shell members 12 and 14 are supported within base member 10 near their handles 26 and at hinge parts 22. This enables the shell members when closed to be turned about a horizontal axis through a 180° angle. This turning of closed shell members 12 and 14 when baking allows any free batter existing within the batter receiving parts 24 to completely cover the interior of the parts, thereby producing a fully formed food item which can evenly bake. Shell members 12 and 14 are preferably formed of a good heat conducting material, such as magnesium or aluminum, with handles 26 being formed of wood or a similar insulative material. Base member 10 may be formed of magnesium, aluminum or cast iron. The upper edge of base member wall 16 is diametrically notched at 34 to receive a stop lug 36 formed cooperatively on shell members 12 and 14. Stop lug 36 acts as a means by which the closed shell members when turned upon base member 10 will be stopped in a horizontal position.

Figure 8:
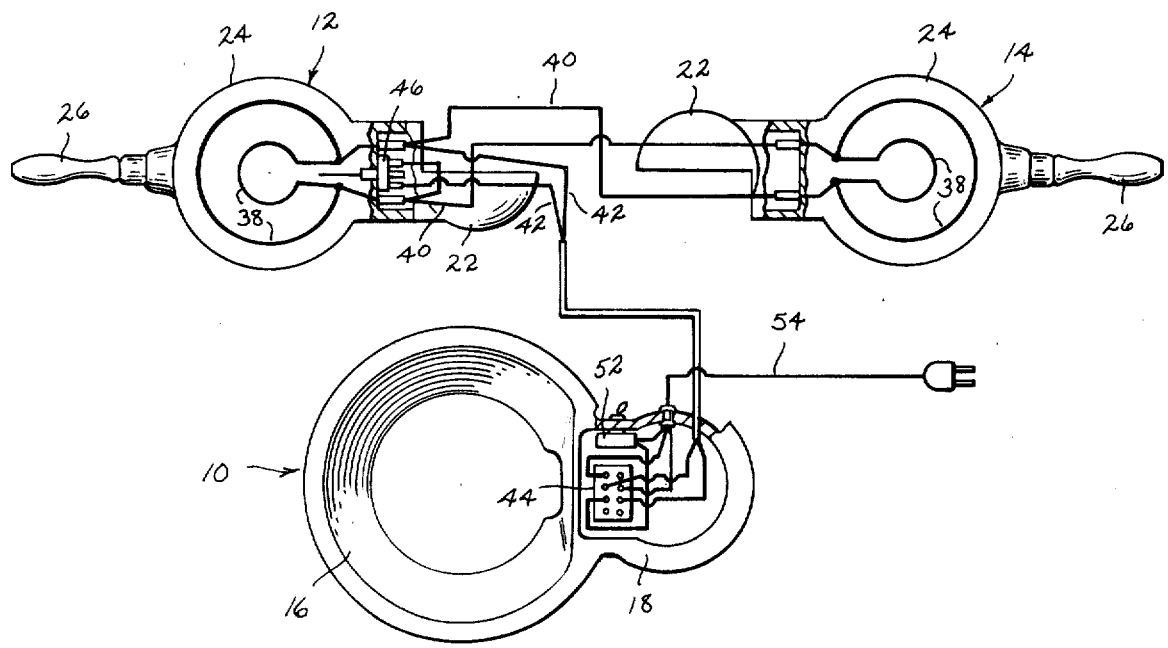
FIG. 8 is a diagrammatic view of the electrical and heating system for the baker.

Each shell member 12 and 14 includes one or more electrical heating elements 38 which are located or embedded within its batter receiving part 24. As illustrated in FIG. 8, heating elements 38 in the shell members 12 and 14 are connected in parallel by flexible wires 40. Flexible wires 42 connect the heating elements 38 to a junction 44 mounted within base member 10. A thermostat 46 is located in one of the shell members 12 or 14 with its sensor extending into the food receiving part 24 of the shell member. Thermostat 46 is connected to one of the wires 42 which connect the heating elements to the junction box 44 in base member 10 and serves as a temperature regulating switch to the heating elements. Wires 42 are partially sheathed and extend through an opening 48 in one of the hinge parts 22 of the shell members. With hinge parts 22 of the shell members complementally positioned so as to form a sphere receivable within socket 20 of base member 10, the wires 40 therein fit compactly within the hollow 43 formed within the confronting hinge parts. Sheathed wires 42 extend through the opening 48 in one of the shell members and through a slotted opening 50 formed in the bottom of socket 20 of base member 10. This arrangement permits the shell members to be supported by base member 10 and to be turned as illustrated in FIGS. 3 and 4 without tangling or cutting of the heating element wires 40 and 42.

Figure 2:
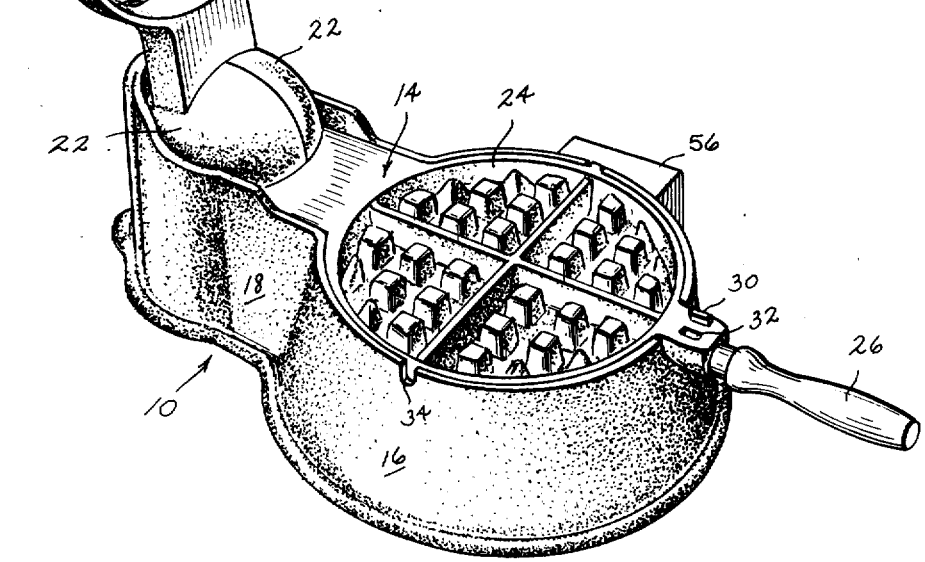
FIG. 2 is a perspective view of the baker showing the shell members in their open position.
Figure 7:
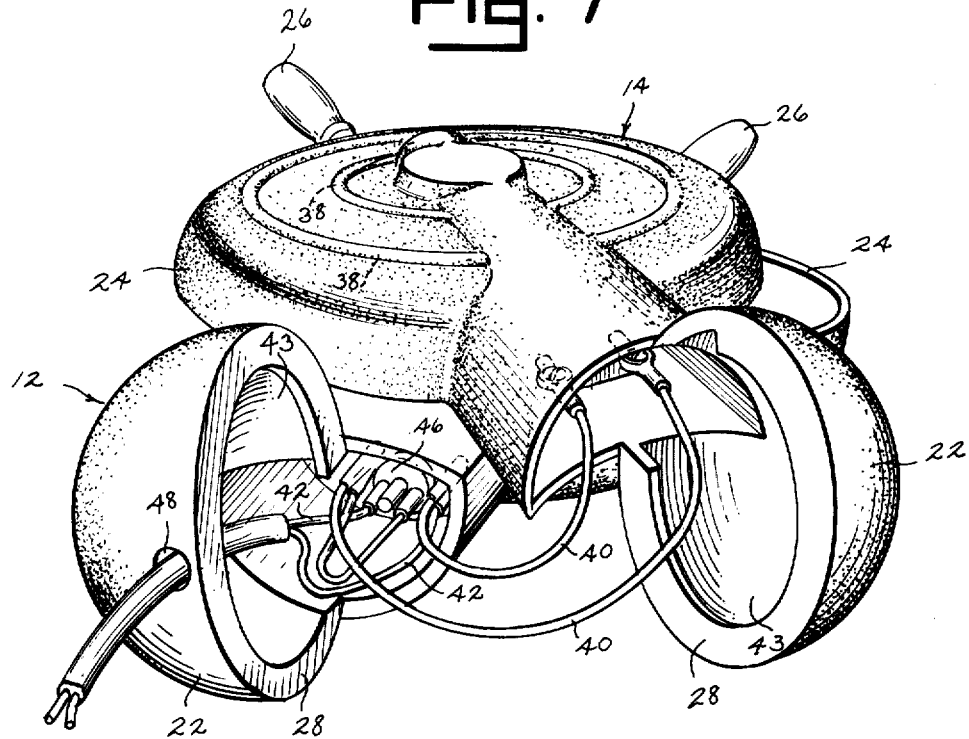
FIG. 7 is a perspective view of the shell members showing the parts thereof in separated form.

Additionally, with one shell member being supported horizontally by base member 10, as illustrated in FIG. 2, the other shell member can be pivoted at its hinge part 22 and raised by its handle 26 so as to permit the batter to be poured into the horizontal or lower shell member or to permit a baked food item to be removed therefrom. This opening and closing of the shell members can be accomplished without tangling or cutting of wires 40 and 42. Slotted opening 50 in base member 10 allows sheathed wires 42 to move freely relative to the base member as the shell members 12 and 14 are pivoted in multiple directions with hinge part 22 being seated within socket 20 of the base member. Further, shell members 12 and 14 can be separated from base member 10, as illustrated in FIG. 6, for cleaning without disconnecting wires 40 and 42. A switch 52 is mounted to base member 10 and is connected between junction 44 and a power cord 54. Power cord 54 extends through base member 10 and is utilized to connect the baker to an exterior electrical power source. To assist in the baking operation, a spring actuated timer 56 may also be mounted to base member 10. Although not shown, timer 56 may be electrically connected into the circuitry for the heating elements so as to automatically terminate power to the elements after a selected duration of baking time.

To utilize the above described baker, the power cord 54 is plugged into an electrical outlet and switch 52 turned on so as to cause heating elements 38 in each of the shell members 12 and 14 to become heated. One of the shell members 12 and 14 is opened as illustrated in FIG. 2 and the interior of the food receiving parts 24 thereof is coated with butter or a similar substance to prevent the batter from sticking to the shell members during baking. The batter is then poured into the open lower shell member and the open upper shell member is closed. The shell members are turned 180° during the baking process. Once the food item is baked, the upper shell member is opened to expose the baked food item and the food item removed.

Figure 9:
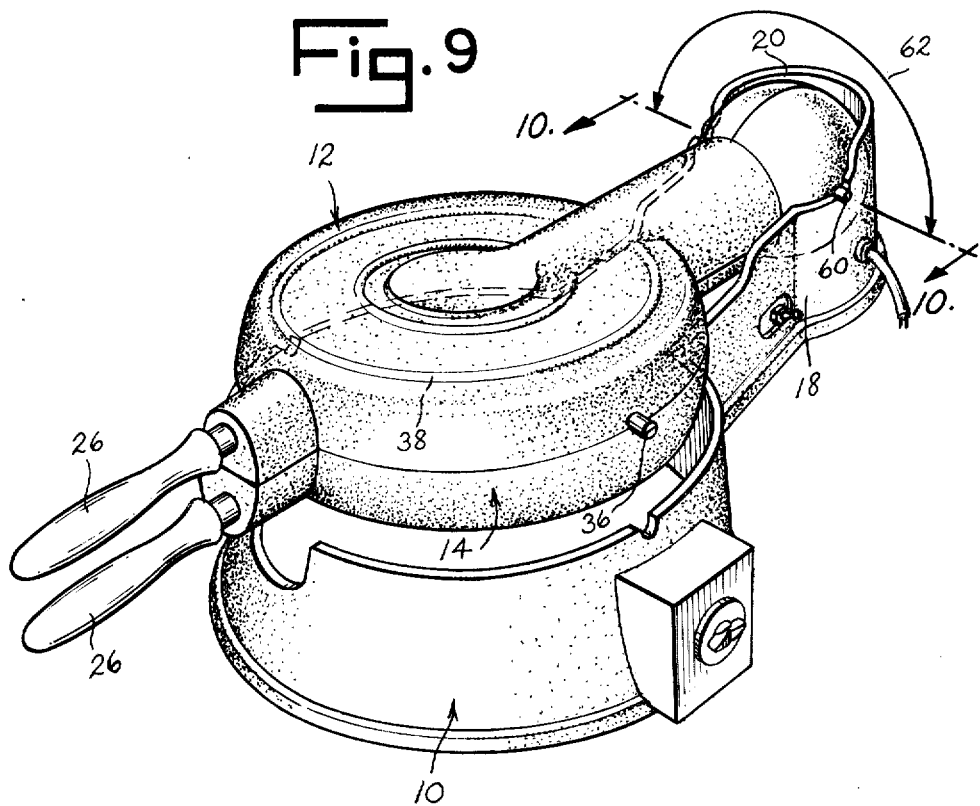
FIG. 9 is a perspective view of a modified embodiment of the baker showing the shell members thereof in their closed position and in preparation for turning.
Figure 10:
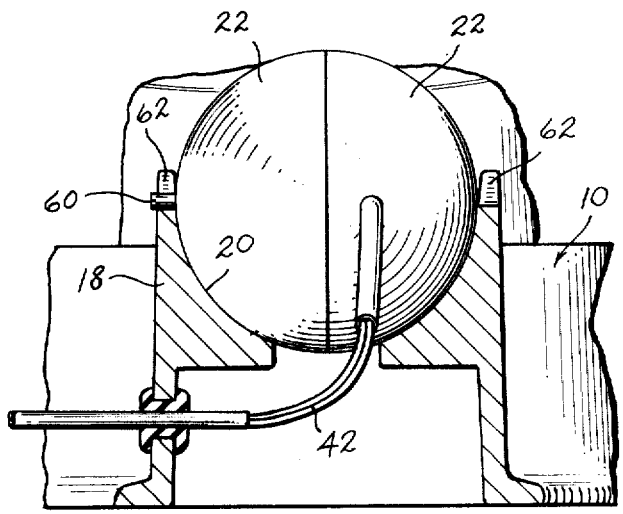
FIG. 10 is a fragmentary sectional view taken along line 10—10 of FIG. 9.

In FIGS. 9 and 10 the baker previously described is modified to include a pin 60 which projects outwardly from hinge part 22 of shell member 14. Pin 60 is preferably aligned with the transverse pivot axis of hinge parts 22 indicated by the sectional line 10—10 shown in FIG. 9.

Tongue 18 of base member 10 has a pair of oppositely located grooves 62 formed therein for the purpose of accommodating pin 60 upon pivotal or turning movement of closed shell members 12 and 14. When it is desired to turn shell members 12 and 14 during the baking process, handles 26 are grasped and the closed shell members raised as a unit with hinge parts 22 remaining seated within socket 20 of base member 10 as shown in FIG. 9. The closed shell members 12 and 14 are then rotated so as to reverse the positions of the shell members with pin 60 shifting, as indicated by double ended arrow 62 in FIG. 9, from one groove 62 to the other groove 62 in tongue 18. Contact of pin 60 with tongue 18 at grooves 62 serves as a stop means which prevents the shell members from being rotated through 360°, which if permitted would cause wires 42 connected to heating elements 38 to become twisted and tangled and eventually broken.

It is to be understood that the invention is not to be limited to the details above given but may be modified within the scope of the appended claims.

What I claim is:

1. A baker for waffles, pancakes and similar food items comprising first and second shell members each having a hinge part and a concave food receiving part, said shell members having their respective hinge parts in a juxtaposed cooperating relationship and being pivotal thereabout between a closed position in which said food receiving parts confront one another to form an enclosed baking cavity and an open position in which said shell members are separated at said food receiving parts, heating element means in each shell member at said food receiving part thereof, a base, said base including spaced means for removably supporting said shell members at spaced points and for permitting said shell members when so supported and in their closed position to pivot as a unit about a horizontal axis, each shell member including a handle part, the food receiving part of each shell member located between said handle part and hinge part of the shell member with the handle part being oppositely located from the hinge part, said spaced points constituting said hinge parts and a portion of said shell members adjacent said handle parts, said shell members when supported upon said base being pivotal through 180° about said horizontal axis which extends through said spaced points, electrical wiring means for connecting the heating element means of each shell member to an electrical power source, said base including a socket part, each of said hinge parts including a semi-spherical wall, said hinge part walls cooperating to define a two-part hollow spherical member received pivotally within said socket part, said socket part having a lower opening therein underlying said spherical member, at least one of said hinge part walls having an opening therein, said wiring means extending through said wall opening and socket part opening, and stop means carried by at least one of said shell members and engageable with said base for limiting pivotal movement of said shell members about said horizontal axis.

2. The baker of claim 1 wherein said stop means is carried by one of said hinge parts, said stop means for alternately engaging said socket part at diametrically spaced locations of the socket part as said hinge parts are rotated within the socket part during pivotal movement of said shell members about said horizontal axis.

3. The baker of claim 2 wherein said stop means is a pin, said socket part including an upper edge having diametrically positioned groove means therein for accommodating said pin.

* * * * *